Patented Oct. 9, 1945

2,386,347

UNITED STATES PATENT OFFICE 2,386,347

INTERPOLYMERS OF ETHYLENE WITH VINYL ESTERS AND PRODUCTS THEREFROM

John R. Roland, Jr., Wilmington, Del., assignor to E. I. du Pont de Nemours & Company, Wilmington, Del., a corporation of Delaware No Drawing. Application February 13, 1945, Serial No. 577,736

29 Claims. (Cl. 260—86)

This invention relates to polymers and more particularly to polymeric alcohols, and to a method of preparing the same. Still more particularly it relates to fibers and films and their preparation from said polymeric alcohols.

This application is a continuation of my copending application Serial No. 446,114, filed June 6, 1942.

An object of this invention is to provide polymers having good fiber- and film-forming properties. A further object is to provide polymeric alcohols which are strong, tough and relatively insensitive to water and to most of the common organic solvents. A still further object is the provision of polymeric alcohols which are not dissolved by cold water. Still another object is to provide polymeric alcohols which are insoluble in hot water. A still further object is the provision of polymeric alcohols capable of being meltspun into fibers. A still further object is to provide polymeric alcohols which can be spun easily from solution in an organic solvent. Still another object is to devise a simple and economical method for preparing such polymers. Another object is to provide fibers and films composed of these polymers. The above and other objects will more clearly appear from the following description.

I have found that interpolymers of ethylene and an organic monocarboxylic acid ester of vinyl alcohol, wherein the ester content is relatively high, can be hydrolyzed to form interpolymers of ethylene and vinyl alcohol which are related to polyvinyl alcohol resins. These polymeric ethylene-vinyl alcohol compositions exhibit the important advantageous characteristics of polyvinyl alcohols, such as strength, toughness and insensitiveness to most of the common organic solvents, but are superior to polyvinyl alcohols in that they are not dissolved by cold water and have excellent wet strength.

The above objects, therefore, are accomplished by my invention which, briefly stated, comprises hydrolyzing an ethylene-organic monocarboxylic acid vinyl ester interpolymer having a relatively high ester content, isolating the polymeric products of the hydrolysis reaction, and thereafter, if desired, converting the polymers into fibers and/or films.

In a more restricted embodiment, this invention comprises hydrolyzing, by heating in an alkaline liquid medium comprising at least 25% by weight of a primary alcohol which is liquid at 25° C., a solid, macromolecular interpolymer of ethylene with a vinyl ester of an organic monocarboxylic acid having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one, but not more than three, carbon atoms, the mol ratio of said vinyl ester to said ethylene in said interpolymer being within the range of from 1:5 to 50:1.

In a still more restricted embodiment, this invention comprises hydrolyzing, by heating in an alkaline liquid medium comprising at least 25% by weight of an alcohol having the general formula $C_nH_{2n+1}OH$, wherein $n$ is a positive integer within the range of from one to four, a solid, macromolecular interpolymer of ethylene with a vinyl ester of an acid having the general formula $C_nH_{2n+1}COOH$, wherein $n$ is a positive integer within the range of from 1 to 6, the mol ratio of said vinyl ester to said ethylene in said interpolymer being within the range of form 1:5 to 50:1.

The novel products of my invention are solid, macromolecular, hydrolyzed interpolymers of ethylene with a vinyl ester of an organic monocarboxylic acid, said hydrolyzed interpolymers having the empirical formula $$(C_2H_4)_x.(C_2H_3OH)_y.(C_2H_3OR)_z$$

wherein R is an acyl radical of an organic monocarboxylic acid and $x$, $y$ and $z$ are numbers, the ratio of $y+z$ to $x$ being within the range of from 1:5 to 50:1, (i. e., the mol ratio of vinyl ester to ethylene in the interpolymer prior to hydrolysis being within the range of from 1:5 to 50:1), and the ratio of $y$ to $z$ being at least 4:1, (i. e., the interpolymer being at least 80% hydrolyzed).

Preferred products of my invention are solid, macromolecular, hydrolyzed interpolymers of ethylene with a vinyl ester of an organic monocarboxylic acid, said hydrolyzed interpolymers having the property of substantial wet strength, when in the form of untreated pellicles, and having the empirical formula

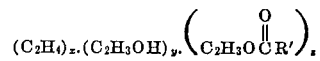

wherein R' is of the group consisting of hydrogen atoms and hydrocarbon radicals, free from unsaturated linkages between acyclic carbon atoms, in which any carbon atom alpha to the carbon atom in the carbonyl group is attached to at least one but not more than three carbon atoms, and wherein $x$, $y$ and $z$ are numbers, the ratio of $y+z$ to $x$ being within the range of from 1:5 to 50:1 and the ratio of $y$ to $z$ being at least 4:1.

The polymers operative in the invention are macromolecular organic compounds containing a plurality of recurring units, i. e., are high polymers. More specifically, said polymers are organic compounds having a degree number, i. e., a degree of polymerization, as defined by Staudinger in Die hochmolekularen organischen Verbindungen (1932) cited by Marvel and Horning in 1 Gilman, Organic Chemistry (2d ed. 1943)

741, of at least 100. A "homopolymer" is a polymer in which said recurring units are the same; while an "interpolymer" is a polymer in which said recurring units are different.

Untreated pellicles of the hydrolyzed interpolymers of this invention may be obtained by casting at a temperature of less than 100° C. a solution consisting of the hydrolyzed interpolymer dissolved in an inert solvent. Said pellicles consist of a hydrolyzed interpolymer which has neither been subjected to an insolubilizing thermal treatment nor to treatment with any insolubilizing agent, such as diisocyanates, formaldehyde, poly-N-methylol compounds, ethers of poly-N-methylol compounds, diacyl chlorides, or other polyfunctional reagents.

By the expression "having substantial wet strength in the form of pellicles," as employed herein and in the appended claims, it is meant that a membrane or thin film or sheet of the material being tested, e. g., one having a thickness of from 0.005 in. to 0.05 in., after immersion in water at room temperature, e. g. 20° C., for a period of time at least long enough to soak the sample, e. g. at least 30 minutes, has substantial strength, e. g., a tensile strength of at least 300 lbs./sq. in.

The term "hydrolysis," as used herein and in the accompanying claims is intended to include alcoholysis as well as hydrolysis with the use of water.

Interpolymers of ethylene and an organic monocarboxylic acid vinyl ester useful in this invention are those soluble in alcohol or in alcohol-toluene mixtures, having a mol ratio of vinyl ester to ethylene greater than 1:5, which in the case of vinyl acetate and ethylene represents, on a weight basis, about 40% or more of vinyl acetate. Interpolymers soluble in alcohol or in alcohol-toluene mixtures and having a high proportion of ester, can be prepared most advantageously by copolymerizing ethylene and an organic monocarboxylic acid vinyl ester, for example vinyl acetate, at temperatures of about 100° C. or less and at an ethylene pressure below 1000 atmospheres in the presence of a peroxy catalyst. Interpolymerization at pressures and temperatures in excess of those above stated, tends to give interpolymers having a mol ratio of vinyl ester to ethylene of 1:8 to 1:30, which is substantially below the limit suited for the purposes of this invention.

Hydrolysis or alcoholysis of the ethylene-vinyl ester interpolymers is preferably carried out by dissolving the interpolymer in a primary alcohol which is liquid at 25° C., such as methanol or ethanol, or in a mixture of said alcohol and a hydrocarbon, such as toluene, containing at least 25% by weight of said alcohol, and then treating with a suitable hydrolyzing agent or catalyst such as alkali or mineral acid. The hydrolysis may be partial or complete, depending upon the nature of the solvent, the amount and kind of catalyst used, and the time and temperature of reaction. The following general principles apply: (1) The greater the amount of vinyl ester in the interpolymer, the more rapid the rate of hydrolysis; (2) alkali hydrolyzing agents ordinarily give more rapid rates of hydrolysis than mineral acid catalysts.

Complete hydrolysis can be obtained in most cases by dissolving the interpolymer in alcohol or alcohol-toluene to give about a 10% solution, adding an excess of sodium or potassium hydroxide in alcohol and refluxing for about one hour. Those interpolymers having a mol ratio of vinyl ester to ethylene not greater than 2:1 will remain in solution throughout the refluxing process but will precipitate when the solution of hydrolyzed interpolymer is cooled. Interpolymers having higher vinyl ester contents become insoluble in the hot reaction mixture as hydrolysis proceeds. The hydrolyzed products can be separated from the solvent by steam distillation or by simple filtration. Completely hydrolyzed products thus obtained can be pressed between heated plates or cast from suitable solvents to give films. Such films are much stiffer and tougher than films from the unhydrolyzed interpolymer and generally also have much higher softening temperatures. These films are all insoluble in cold water, even when they are obtained from hydrolyzed ethylene-vinyl ester interpolymers containing as little as 2% or less by weight of ethylene. As a matter of fact said films are all insoluble in cold water, even when they are obtained from alkaline hydrolyzed ethylene-vinyl ester interpolymers in which the mol ratio of vinyl ester to ethylene in the interpolymer prior to hydrolysis is as high as 50:1. They are thus much less water-sensitive than polyvinyl alcohol films. However, they still retain the characteristic resistance of polyvinyl alcohol to hydrocarbons and other organic solvents. These hydrolyzed interpolymers are more compatible with ester-type, water-insoluble plasticizers than is polyvinyl alcohol, and have a better toughness at low temperatures either with or without plasticizer than does polyvinyl alcohol.

In certain instances it may be desirable to stop the hydrolysis short of completion. The hydrolysis can be controlled so that it proceeds to the extent of only 80-95%, i. e. until 80-95% of the ester groups have been replaced by hydroxyl groups. This control can be accomplished by such expedients as using an acid catalyzed alcoholysis with sulfuric acid and ethyl or methyl alcohol, or using less than the theoretical amount of caustic, or controlling the time and temperature of reaction suitably. The exact conditions to use to obtain a given degree of hydrolysis will, of course, vary with the vinyl ester content of the interpolymer used. The partially hydrolyzed products are different from the completely hydrolyzed materials in that they are much more soluble in organic solvents, more pliable, have a better low temperature toughness, soften at a slightly lower temperature, and elongate much more before breaking. These differences in physical properties make the partially hydrolyzed products preferred to the completely hydrolyzed products in certain uses, such as fabric coatings where good pliability is desirable, safety glass interlayers, and fuel cell liners where good low temperature toughness is necessary.

Both the partially and completely hydrolyzed products of this invention can be converted into fibers by melt or solvent spinning. Although it has proved impossible to melt spin polyvinyl alcohol, the polyalcohols of this invention containing as little as 10% by weight of ethylene can be readily melt spun. In addition, the hydrolyzed interpolymers of this invention can be spun from a solution, e. g., an alcoholic solution. The strength per unit cross section of the fibers can be greatly increased by cold or hot drawing processes in such media as air, water, mineral oil, or the like, maintained at the proper temperature. The length of these fibers can be increased in some instances as much as ten-fold by such drawing operations. The drawn fibers show by characteristic X-ray patterns orientation along the fiber axis. The melting point and/or resistance to shrinkage in boiling water of these fibers can be increased by thermal treatment and/or crosslinking with diisocyanates, formaldehyde, poly-N-methylol compounds, e. g. dimethylolurea and dimethyloluron, ethers of poly-N-methylol compounds, diacyl chlorides, and other polyfunctional reagents capable of reacting with hydroxyls.

My invention is further illustrated by the following examples wherein parts and percentage compositions are by weight unless otherwise indicated.

*Example I*

Four hundred parts of an interpolymer of ethylene and vinyl acetate having a mol ratio of vinyl acetate to ethylene of 2.4:1 (i. e., 88% by weight of vinyl acetate) were dissolved in 1700 parts of 95% ethanol. To this refluxing, well-stirred solution were added 185 parts of potassium hydroxide dissolved in 900 parts of 95% ethanol. After the exothermic reaction ceased, refluxing was continued for one hour. The ethanol was removed by steam distillation, leaving behind the water-insoluble polymeric product which was isolated by filtration. After drying, the yield of hydrolyzed polymeric material amounted to 216 parts. Analysis showed that the material was 95% hydrolyzed.

Rods were molded from this hydrolyzed interpolymer and melt spun into filaments at a temperature of 190° C. by the use of the displacement spinning apparatus described in U. S. Patent No. 2,253,089. The length of the filaments could be increased up to five times by passing them through a kerosene bath at 85° C. under tension. These highly drawn filaments had dry tenacities of 3.6 g./d. with 7% elongation (i. e., the filaments elongated 7% before breaking) and wet tenacities of 2.1 g./d. with 7% elongation. The drawn filaments were oriented and possessed good receptivity for acetate and oil-soluble dyestuffs.

*Example II*

Two hundred parts of an interpolymer having a mol ratio of vinyl acetate to ethylene of 4.3:1 (93% by weight of vinyl acetate) were dissolved in 1500 parts of 95% ethanol and a solution of 97 parts of potassium hydroxide in 500 parts of 95% ethanol was added to the stirred, boiling solution. After refluxing for one hour, the alcohol was removed by steam distillation. The insoluble, hydrolyzed product was broken up and washed twice in fresh portions of hot water. The weight of dried product amounted to 101 parts. The hydrolysis was 96% complete. The hydrolyzed interpolymer was melt spun into fibers at 195° C. by the method described in Example I, the fibers being quenched in trichloroethylene at 0° C. The fibers were stretched to eight times their original length by passage under tension through a mineral oil bath maintained at 125° C. The oriented fibers had dry tenacities of 4.9 g./d. with 8% elongation and wet tenacities of 3.6 g./d. with 6% elongation. The modulus of elasticity was 45 g./d. and the fibers recovered 100% from a 4% stretch.

*Example III*

To 285 parts of an interpolymer having a mol ratio of vinyl acetate to ethylene of 1:3.2 (49% by weight of vinyl acetate) dissolved in a mixture of 1500 parts of toluene and 1000 parts of 95% alcohol were added with stirring at the boiling point 100 parts of potassium hydroxide dissolved in 500 parts of 95% alcohol. After refluxing for two hours the solvent mixture was removed by steam distillation. The insoluble, hydrolyzed material was washed twice in hot water and after drying amounted to 206 parts. Determination of the saponification number showed that the material was 96% hydrolyzed. The hydrolyzed interpolymer was melt spun at 160° C. as described in Example I, and the spun fibers were stretched to three times their original length at 60° C. in water. The stretched fibers had tenacities of 2.5 g./d. with 19% elongation and recovered 100% from an 8% stretch.

*Example IV*

Two hundred forty parts of an interpolymer having a mol ratio of vinyl acetate to ethylene of 1:1.2 (72% by weight of vinyl acetate) were dissolved in a boiling mixture of 1000 parts of toluene and 1000 parts of 95% alcohol. A solution of 142 parts of potassium hydroxide in 500 parts of 95% alcohol was then added with stirring. After refluxing for one hour, the solvent was removed by steam distillation and the insoluble hydrolyzed material was washed twice with hot water. The dry material amounted to 152 parts. It was spun into fibers at 190° C. as described in Example I, and these fibers were stretched in mineral oil at 90° C. to four times their original length. The stretched fibers had dry tenacities of 3.3 g./d. with 13% elongation and wet tenacities of 2.5 g./d. with 10% elongation. The fibers recovered 100% from an 8% stretch and had a modulus of elasticity of 45 g./d.

*Example V*

Thirty parts of an interpolymer having a mol ratio of vinyl acetate to ethylene of 1:3.1 (50% by weight of vinyl acetate) were dissolved in 300 parts of n-butanol which contained 7% of potassium hydroxide. The solution was heated under reflux with rapid stirring for four hours and the butanol was then removed from the reaction mixture by steam distillation. As the steam distillation proceeded, the butanol-soluble, water-insoluble hydrolysis product precipitated from the steam distillation mixture. It was isolated by filtration. The yield of dried product amounted to 22 parts. Analysis showed that it was completely hydrolyzed.

*Example VI*

Fifteen parts of an interpolymer having a mol ratio of vinyl acetate to ethylene of 1:3.1 (50% by weight of vinyl acetate) were dissolved in 75 parts of toluene and 75 parts of 95% ethanol by heating under reflux. Four parts of potassium hydroxide dissolved in 20 parts of 95% ethanol were added to the refluxing solution of the interpolymer and refluxing was continued for two hours. The toluene and alcohol were removed from the reaction mixture by steam distillation, leaving behind the water-insoluble hydrolysis product. The yield of dried product amounted to 11.3 parts. It was found to have a saponification number of 60, indicating that the hydrolysis was about 86% complete.

Films of the latter two hydrolyzed products (Examples V and VI) and of the original unhydrolyzed ethylene-vinyl acetate interpolymer containing 50% by weight of vinyl acetate were pressed between heated plates. The unhydrolyzed material was tacky at room temperature, was extremely pliable and rubbery, and had a tensile strength of only 220 lbs./sq. in., based on the original dimensions, with 700% elongation and failed to break at this amount of elongation. The unhydrolyzed material was soluble to a limited extent in toluene, butyl acetate, trichlorethylene, acetone, dioxane, acetic acid, m-cresol, and aliphatic hydrocarbons. Films of the two hydrolyzed materials were found to have a dry feel at room temperature, had higher softening temperatures, and were much stronger and stiffer than the film of the unhydrolyzed material. The film of the 86% hydrolyzed material had a tensile strength of 3000 lbs./sq. in. based on the original dimensions with 320% elongation before breaking, and after soaking in water for one day was substantially unaffected. The film from the completely hydrolyzed material had a tensile strength of 2200 lbs./sq. in. with 20% elongation. Both of the hydrolyzed materials were insoluble in toluene, trichlorethylene, acetone, and aliphatic hydrocarbons. Furthermore, films of these materials were not swollen by immersion in aliphatic hydrocarbons or in benzene for one week, and the tensile strengths of the samples when wet by water were only slightly decreased. A film of the 86% hydrolyzed material had a low permeability to aviation gasoline, the rate of transmission being of the order of 10 mg./sq. in./day. A film of the completely hydrolyzed material was even more impermeable to aviation gasoline.

The hydrolyzed materials of Examples V and VI were compatible with a large variety of commercial plasticizers such as, for example, beta-ethoxyethyl adipate, di(methylcyclohexyl) adipate, "Santicizer B-16," 1,12-diphenyloloctadecane, hexaethylene glycol, tricresyl phosphate, dibutyl phthalate, and "Cyclonol." In general, the effect of these plasticizers was to render the materials more pliable. It was possible to raise the softening point, increase the tensile strength, increase the toughness, reduce the solubility, and increase the resistance to failure by flexing of films of these hydrolyzed interpolymers by treatment with such agents as formaldehyde, dimethylolurea, bis(methoxymethyl)urea, bis(methoxymethyl)uron, hexamethylene, diisocyanate and the like.

Furthermore, the hydrolyzed ethylene-vinyl ester interpolymers could be readily insolubilized by treatment with a mineral acid followed by a heat treatment. This resulted in an increase in softening temperature as well as a decrease in solubility. The most suitable acids were sulfuric, phosphoric and hydrochloric.

*Example VII*

Two hundred parts of an interpolymer having a mol ratio of vinyl acetate to ethylene of about 1.2:1 (78% by weight of vinyl acetate) and which was tacky at room temperature and so soft that a lump could readily be molded between the fingers, were dissolved in 800 parts of toluene and 800 parts of methanol, and 80 parts of sodium hydroxide dissolved in 800 parts of methanol were added to the hot solution. The solution was refluxed for two hours to effect hydrolysis and was then steam distilled to remove the toluene and methanol. The water-insoluble product was isolated by filtration. After drying, it amounted to 121 parts. This material was found to have a saponification number of zero. A film pressed from this hydrolyzed product had a softening temperature of about 160° C., a tensile strength of 5000 lbs./sq. in., and was relatively stiff.

*Example VIII*

Ten parts of an interpolymer having a mol ratio of vinyl acetate to ethylene of about 1.2:1 (78% by weight of vinyl acetate) were dissolved in 25 parts of toluene and 40 parts of methanol, and ⅓ part of sodium hydroxide was added. The solution was refluxed for one hour and was then steam distilled. The yield of dried product amounted to 6.7 parts. It had a saponification number of 83, indicating that the hydrolysis was 90% complete. A film pressed from this hydrolyzed product had a softening temperature of 130° C., a tensile strength of 2900 lbs./sq. in., and was less stiff than the film from the hydrolysis product of Example VII.

*Example IX*

Ten parts of an interpolymer having a mol ratio of vinyl acetate to ethylene of about 1.2:1 (78% by weight of vinyl acetate) were dissolved in 10 parts of glacial acetic acid and 5 parts of water. About 0.5 part of p-toluene sulfonic acid was then added. On warming the reaction mixture a homogeneous solution was obtained. After one-half hour an additional 5 parts of water was added and the solution was kept at its boiling point for ten hours. Addition of more water precipitated the hydrolyzed product, which was washed and dried. The yield of hydrolyzed interpolymer was 8.5 parts.

*Example X*

Thirty parts of a vinyl acetate-ethylene interpolymer having a mol ratio of vinyl acetate to ethylene of about 5.6:1 (94.5% by weight of vinyl acetate) were dissolved in 150 parts of methanol, and 1.5 parts of sodium hydroxide in 50 parts of methanol were added to the well stirred solution. In a very short time the product of hydrolysis precipitated from the reaction mixture. It was isolated by filtration and washed with methanol. It was further washed with water to obtain 14.7 parts of methanol-insoluble, cold water-insoluble product. Although the product was cold water-insoluble, it could be dissolved in a mixture of equal parts of water and glacial acetic acid to obtain a viscous solution. A film cast from this solution was clear and very tough. It had a tensile strength of 5500 lbs./sq. in.

*Example XI*

Twenty parts of an interpolymer having a mol ratio of vinyl acetate to ethylene of about 16:1 (98% by weight of vinyl acetate) were dissolved in 100 parts of hot methanol, and 1 part of sodium hydroxide in 40 parts of methanol was added to the hot solution. Hydrolysis proceeded very rapidly, and the insoluble hydrolyzed interpolymer precipitated from the reaction mixture. It was isolated by filtration and was then thoroughly washed first with methanol and then with cold water. The product (9.5 parts) thus isolated was insoluble in cold water but could be dissolved in a mixture of 4 parts water and 1 part glacial acetic acid to obtain a viscous solution. A film cast from this solution had a tensile strength of 6500 lbs./sq. in.

*Example XII*

An interpolymer of vinyl acetate with ethylene in which the mol ratio of vinyl acetate to ethylene was 1:2.3 (57% by weight of vinyl acetate) was hydrolyzed in a toluene-ethanol mixture with excess potassium hydroxide. The resultant solid was steam distilled, thereby removing the solvents, and the interpolymer was washed with water. The resultant hydrolyzed vinyl acetate/ethylene interpolymer which had an intrinsic viscosity of 1.18 was melt spun from a ten-hole spinneret at a spinneret temperature of 215° C. The yarn thus obtained was oriented by drawing in steam at 100° C. at a draw ratio of 5.2:1 to give a yarn having a dry tenacity of 7.0 g./d. at 9.6% elongation and a wet tenacity of 7.0 g./d. at 9.5% elongation.

*Example XIII*

An interpolymer of vinyl acetate with ethylene in which the mol ratio of vinyl acetate to ethylene was 1:2.6 (54% by weight of vinyl acetate) was hydrolyzed under anhydrous conditions in a mixture of toluene and methanol with potassium hydroxide as the hydrolysis catalyst. The salts resulting from the hydrolysis were removed from the hydrolyzed interpolymer by washing the latter with cold methanol. The resultant hydrolyzed interpolymer, which had an intrinsic viscosity of 1.01, was then subjected to a treatment with boiling methanol to extract low molecular weight constituents. After the latter operation the intrinsic viscosity of the hydrolyzed interpolymer was 1.24.

A 19% solution of this hydrolyzed interpolymer in a mixture of 20 parts trichloroethylene, 10 parts of absolute ethanol and one part water had a viscosity of 70 poises at 60° C. Fibers were obtained by spinning said solution from a ten-hole spinneret at a cell temperature of 175° C. These fibers were oriented by drawing in steam at 97° C. at a draw ratio of 6.4:1 to give a yarn having a dry tenacity of 6.0 g./d. at 10.4% elongation and a wet tenacity of 5.9 g./d. at 10.2% elongation.

*Example XIV*

A 27.5% aqueous solution of a substantially completely hydrolyzed ethylene/vinyl acetate interpolymer which contained about 5% ethylene (i.e. in which the mol ratio of vinyl alcohol to ethylene was about 12:1) and which had a viscosity of 200 poises at 95° C., was dry spun from a twelve-hole spinneret at a cell temperature of 200° C. The resultant yarn after thorough drying was oriented by drawing at a temperature of 193° C. The stretched yarn had a dry tenacity of 10 g./d. at 5.2% elongation and a wet strength of 6.2 g./d. at 21% elongation. The yarns thus obtained had a very high modulus and were inert to organic solvents.

In contrast to the high wet strength of the above hydrolyzed interpolymer, polyvinyl alcohol fibers prepared under comparable conditions had no wet strength at all, being dissolved in water. Moreover, the dry strength of polyvinyl alcohol fibers prepared in a similar manner was not as high as that of the above hydrolyzed interpolymers. Furthermore, the aforementioned filaments of hydrolyzed ethylene/vinyl monocarboxylic organic acid interpolymers can be drawn at draw ratios of as high as 10:1, while filaments of polyvinyl alcohol have not been drawn at draw ratios higher than 7.9:1.

*Example XV*

Two hundred parts of an interpolymer of vinyl acetate with ethylene, in which the mol ratio of vinyl acetate to ethylene was 25:1 (98.65% by weight of vinyl acetate) were dissolved in 1000 parts of hot methanol, and 10 parts of sodium hydroxide in 400 parts of methanol were added to the hot solution. Hydrolysis proceeded very rapidly and the insoluble, completely hydrolyzed interpolymer precipitated from the reaction mixture. It was isolated by filtration and was then thoroughly washed, first with methanol and then with cold water. To a solution of 35 parts of the completely hydrolyzed interpolymer in 480 parts of water and 35 parts of ethanol was added a mixture of 55 parts of ammonium bromide and 1 part of potassium iodide. To the resultant solution was then added with stirring a solution consisting of 90 parts of silver nitrate, 900 parts of water and 100 parts of ammonium hydroxide. The mixture thereby obtained was stirred at 40° C. for one hour and coagulated by adding 700 to 1000 parts of a 10% aqueous solution of sodium sulfate with rapid stirring. The coagulate in the form of curd-like particles was freed of soluble salts by washing with a continuous stream of water for one-half hour. Excess water was decanted and there was added to the coagulate an additional 35 parts of the completely hydrolyzed vinyl acetate/ethylene interpolymer in 500 parts of water and 300 parts of 10% ethanol. After digesting for 30 minutes at 65° C. the resultant photographic emulsion was coated on a baryta-sized paper and dried. It was exposed to a negative image by projection printing and developed in a hydroquinone-p-methylaminophenol sulfate developer and fixed in the normal way to give a black silver positive image of excellent quality. When processing of this projection paper was carried out at a temperature of 50° C., no reticulation occurred.

*Example XVI*

A granular interpolymer of ethylene and vinyl acetate was prepared by polymerizing vinyl acetate under an ethylene pressure of 70–80 lbs./sq. in. at 65°–70° C. with hydrogen peroxide as the catalyst and with starch as the granulating agent. The interpolymer was hydrolyzed in methanol by sodium hydroxide and the hydrolyzed product washed with methanol. The saponification number indicated that the product was substantially completely hydrolyzed. Upon analysis the hydrolyzed polymer had a carbon content of 54.76% and a hydrogen content of 9.17%. This indicated the interpolymer had a molar ratio of vinyl acetate to ethylene of 43:1 (99.25% by weight of vinyl acetate). The wet tensile strength of this hydrolyzed interpolymer was 900 lbs./sq. in. after 30-minute contact of water and 1000 lbs./sq. in. after 24 hours contact. The hydrolyzed interpolymer elongated 47% in water as compared to an elongation of 100% for polyvinyl alcohol.

Treatment of the above type polymers with heat-hardening, phenol-formaldehyde polymers resulted in a further decrease in water sensitivity.

It will be understood, of course, that this invention is not limited to the precise reagents and conditions recited in the above examples, but is susceptible rather to a wide degree of substitution and modification. Thus, the mol ratio of vinyl ester to ethylene in the interpolymer subjected to hydrolysis may be as low as 1:5 and may be as high as 50:1. Interpolymers in which said mol ratio is within the range of from 1:5 to 50:1 are soluble in alcohol or in alcohol-toluene mixtures and, when hydrolyzed, provide new and useful products which are readily converted into novel, strong, useful fibers and which have good solubility in alcoholic solvents, good resistance to hydrocarbons, good tensile properties, high melting points and the ability to be modified by further chemical reaction. Interpolymers in which said ratio is substantially less than 1:5 are to be avoided, since hydrolysis of said interpolymers is difficult and provides products which have low tensile strengths and low softening points. While appreciable effects are had, in certain instances, with interpolymers in which said ratio is as high as about 100:1, the hydrolysis of interpolymers in which said ratio is substantially greater than 50:1 is ordinarily not recommended. Products had upon hydrolyzing interpolymers in which said ratio is substantially greater than 50:1 may be affected adversely by water and aqueous solutions generally. While all hydrolyzed interpolymers in which said ratio prior to hydrolysis is within the range of from 1:5 to 50:1 have substantially improved properties, the optimum ratio within said range in any given instance will depend to a large extent upon the use requirements of the finished product. Thus, hydrolyzed interpolymers obtained by hydrolyzing an interpolymer of a vinyl ester of an organic monocarboxylic acid with ethylene in which said ratio is within the range of from 1:3 to 3:1 are particularly well adapted for the production of filaments and films; while filaments and fibers having optimum properties are obtained when said ratio in the interpolymer subjected to hydrolysis is within the range of from 1:3 to 1:2. Again, substantially completely hydrolyzed interpolymers in which said ratio is within the range of from about 10:1 to about 30:1 are particularly well adapted for use as gelatin substitutes in the production of photographic films.

While this invention has been illustrated with particular reference to interpolymers of ethylene with vinyl acetate, it is to be understood that it is broadly applicable to solid, macro-molecular interpolymers of ethylene with vinyl esters of other monocarboxylic organic acids. Any monocarboxylic organic acid, in the form of its vinyl ester, can be employed in the production of the novel hydrolyzed interpolymers of this invention provided solid, macromolecular homopolymers of said vinyl ester can be hydrolyzed. Included among examples of said interpolymers are interpolymers of ethylene with vinyl formate, vinyl acetate, vinyl propionate, vinyl butyrate, vinyl stearate, vinyl benzoate, vinyl cyclohexanoate, vinyl isobutyrate, vinyl palmitate, vinyl myristate, vinyl toluate, vinyl naphthoate, vinyl campholate, vinyl acrylate, vinyl chloroacetate and the like. Although any solid, macromolecular interpolymer of ethylene with a vinyl ester as hereinbefore defined is operative in my invention, provided the mol ratio of vinyl ester to ethylene is within the range of from 1:5 to 50:1, superior hydrolyzed interpolymers are had more readily when the interpolymer subjected to hydrolysis is an interpolymer of ethylene with a vinyl ester of an organic monocarboxylic acid having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms. Hydrolyzed interpolymers having optimum properties are obtained most readily when the interpolymer subjected to hydrolysis is an interpolymer of ethylene with a vinyl ester of an organic acid having the general formula $C_nH_{2n+1}COOH$, wherein $n$ is a positive integer within the range of from 1 to 6. Inasmuch as the acid group of the vinyl ester is removed by hydrolysis, it is usually most economical to use an interpolymer of ethylene with vinyl acetate which is the most readily available vinyl ester.

The ethylene/vinyl ester interpolymers employed in this invention can be hydrolyzed by any procedure which will effect hydrolysis of solid, macromolecular homopolymers of the vinyl ester contained therein.

The hydrolysis is preferably carried out in a primary alcohol which is liquid at 25° C. or in a solvent mixture of which one component is such an alcohol in the amount of at least 25% by weight of said solvent mixture. The most suitable alcohols are methyl alcohol and ethyl alcohol, but higher alcohols such as propyl, butyl and isobutyl alcohol may also be used to advantage. In cases where the ethylene-vinyl ester interpolymer is not sufficiently soluble in the alcohol used, the solubility of the interpolymer may be improved by the use of a mixed solvent consisting of alcohol together with benzene, toluene, xylene, pyridine, dioxane, trichloroethylene, or the like. In certain cases it may be desirable to carry out the hydrolysis in solvent systems containing appreciable amounts of water, as for example, in mixtures of water with acetic acid, dioxane, ethanol, methanol or other water-miscible solvent.

Any catalyst adapted to promote hydrolysis of a solid, macro-molecular homopolymer of a vinyl ester of an organic monocarboxylic acid is also adapted to promote hydrolysis of a solid, macro-molecular interpolymer of ethylene with said monomeric vinyl ester, provided the mol ratio of vinyl ester to ethylene in said interpolymer is at least 1:5. Thus, the hydrolysis of most of said interpolymers, e. g., interpolymers of ethylene with a vinyl ester of an organic acid having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms, can be effected by straight saponification with an excess of alkali or it can be carried out with only a small amount of alkali to act as an ester interchange or alcoholysis catalyst. Sodium hydroxide is a very satisfactory alkali to use because of its commercial availability and cheapness, but potassium hydroxide and other alkaline materials can also be used with success. In certain instances, particularly where a slower rate of hydrolysis is desired, the hydrolysis can be carried out with an acid catalyst, such as sulfuric acid, phosphoric acid, p-toluenesulfonic acid, hydrochloric acid, and the like. When these catalysts are used, they promote hydrolysis and/or alcoholysis depending on whether the reaction solvent contains water and/or alcohol, respectively. The products as obtained by acid hydrolysis may differ in properties, e. g., water sensitivity, from those obtained by alkaline hydrolysis. Products obtained by the latter method are, therefore, usually preferred.

Hydrolysis can also be carried out by wetting the ethylene-vinyl ester interpolymer with an insufficient amount of alcohol to give a solution, kneading to give a homogeneous mixture, adding an alkaline or acid catalyst, and kneading until the desired degree of hydrolysis is obtained.

With alkaline catalysts the reaction is usually carried out at elevated temperatures, e. g., the boiling point of the solvent, and is generally complete in less than one hour. With acid catalysts or when only a small amount of alkali is used, the reaction may be slower than this, in which case the slowness of the reaction makes it possible to stop it after it has proceeded to the desired extent. This affords a suitable method of controlling the hydrolysis when it is desired to attain a definite degree of hydrolysis. Although the hydrolysis is ordinarily carried out at the boiling point of the solvent, it can be carried out at lower temperatures when a slower rate of hydrolysis is desired.

While alkaline catalysts promote hydrolysis of most solid, macromolecular interpolymers of ethylene with a vinyl ester of an organic monocarboxylic acid, in which the mol ratio of ester to ethylene is within the range of from 1:5 to 50:1, said catalysts have little if any effect on a small percentage of said interpolymers. Thus, homopolymers of vinyl esters of acids having a quaternary carbon atom alpha to the carboxyl group, e. g., polyvinyl campholate, are very resistant to alkaline hydrolysis; and interpolymers of ethylene with said vinyl esters are also very resistant to alkaline hydrolysis. However, difficultly hydrolyzable homopolymers of vinyl esters, such as the aforementioned homopolymers, can be hydrolyzed in ether-splitting reagents, e. g., hydrobromic or hydrochloric acid, under pressure at elevated temperatures; and interpolymers of ethylene with said vinyl esters, in which the mol ratio of vinyl ester to ethylene is at least 1:5, can be hydrolyzed likewise.

The product obtained on complete hydrolysis of the aforementioned interpolymers will be the same regardless of the vinyl ester in the interpolymer. However, the partially hydrolyzed products will differ somewhat depending on the vinyl ester represented in the interpolymer. Structurally the completely hydrolyzed interpolymers are believed to consist of long chains made up of methylene groups and CH(OH) groups, the ratio of methylene groups to CH(OH) groups being greater than 1. The partially hydrolyzed interpolymers differ from the completely hydrolyzed interpolymers in that the polymeric chains contain some CHOR groups (where R is an acyl radical of a monocarboxylic organic acid) in addition to the CH(OH) and methylene groups. More than half of the groups are methylene, however.

The degree of hydrolysis, when considered in conjunction with the mol ratio of ester to ethylene in the interpolymer subjected to hydrolysis, determines whether or not the resultant hydrolyzed interpolymer has the property of substantial wet strength when in the form of untreated pellicles. It has been found, without exception, that when the solid, macromolecular interpolymer of ethylene with vinyl ester of organic monocarboxylic acid, in which the mol ratio of ester to ethylene is within the range of from 1:5 to 50:1, is substantially completely hydrolyzed in an alkaline medium, the resultant substantially completely hydrolyzed interpolymer, when in the form of untreated pellicles, has a wet strength of at least 300 lbs./sq. in. For the most part, completely hydrolyzed interpolymers obtained by hydrolysis in an acid medium, also provide untreated pellicles having wet strengths of at least 300 lbs./sq. in. In a few isolated instances, said complete hydrolysis provides untreated pellicles having wet strengths slightly lower than 300 lbs./sq. in. However, in every instance, completely hydrolyzed interpolymers of ethylene with a vinyl ester of an organic acid, in which the mol ratio of ester to ethylene is within the range of from 1:5 to 50:1, provide untreated pellicles having markedly higher wet strengths than untreated pellicles of the polyvinyl alcohol produced by completely hydrolyzing, under the same conditions, a homopolymer of the vinyl ester contained therein. It has been found that interpolymers hydrolyzed only partially, e. g. 80–98%, are more water-sensitive than the completely hydrolyzed interpolymers. Partially hydrolyzed interpolymers had from interpolymers containing lower percentages of vinyl ester are less water-sensitive than those from interpolymers in which the percentage of vinyl ester is higher. For this reason, partially hydrolyzed interpolymers obtained from interpolymers in which the mol ratio of ester to ethylene is relatively high, say greater than about 6:1, provide untreated pellicles having relatively low wet strengths. However, interpolymers in which said mol ratio is within the range of from 1:5 to 6:1, when partially hydrolyzed, even when only 80% hydrolyzed, provide untreated pellicles having a wet strength of at least 300 lbs./sq. in.

As hereinbefore stated, the novel products of this invention are solid, macromolecular, hydrolyzed interpolmers of ethylene with a vinyl ester of an organic monocarboxylic acid, said hydrolyzed interpolymers having the empirical formula $(C_2H_4)_x.(C_2H_3OH)_y.(C_2H_3OR)_z$, wherein R is an acyl radical of an organic monocarboxylic acid and $x$, $y$ and $z$ are numbers, the ratio of $y+z$ to $x$ being within the range of from 1:5 to 50:1, (i. e., the mol ratio of vinyl ester to ethylene in the interpolymer prior to hydrolysis being within the range of from 1:5 to 50:1), and the ratio of $y$ to $z$ being at least 4:1, (i. e., the interpolymer being at least 80% hydrolyzed). In partially hydrolyzed interpolymers $z$ is a positive number; whereas in completely hydrolyzed interpolymers $z$ is zero.

While substantial effects are had from hydrolyzed interpolymers having the empirical formula $(C_2H_4)_x.(C_2H_3OH)_y.(C_2H_3OR)_z$, as hereinbefore defined, wherein R is an acyl radical of any organic monocarboxylic acid, preferred hydrolyzed interpolymers are those in which R is an acyl radical of an acid having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms, since said hydrolyzed interpolymers are most readily obtained and have very desirable properties. Hydrolyzed interpolymers having the empirical formula $$(C_2H_4)_x.(C_2H_3OH)_y.(C_2H_3OR)_z$$

as hereinbefore defined in which R has the general formula

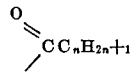

wherein $n$ is a positive integer within the range of from 1 to 6, have optimum properties and are obtained most readily. Hydrolyzed interpolymers in which R is

are obtained most economically and are therefore preferred in most instances.

While all of the hereinbefore defined products of this invention are new and useful, e. g., in the preparation of improved adhesives, coatings, calendered fabric compositions, safety glass interlayers, pellicles or films, or artificial filaments, the preferred products are those, having the empirical formula $(C_2H_4)_x.(C_2H_3OH)_y.(C_2H_3OR)_z$, as hereinbefore defined, which in the form of untreated pellicles, have a wet strength of at least 300 lbs./sq. in., more particularly, a wet strength of at least 1000 lbs./sq. in., e. g., those had by alkaline hydrolysis, in which $z$ is substantially zero, and those in which the ratio of $y+z$ to $x$ is within the range of from 1:5 to 6:1.

All solid, macromolecular, hydrolyzed interpolymers having the empirical formula

$(C_2H_4)_x.(C_2H_3OH)_y.(C_2H_3OR)_z$ in which R is an acyl radical of an organic monocarboxylic acid and $x$, $y$ and $z$ are numbers, the ratio of $y+z$ to $x$ being within the range of from 1:5 to 50:1 and the ratio of $y$ to $z$ being at least 4:1, are markedly more resistant to water than are comparable hydrolyzed vinyl ester homopolymers had according to the hydrolysis procedure employed in obtaining said hydrolyzed interpolymers. Furthermore, all of said hydrolyzed interpolymers can be prepared in the form of filaments, fibers and pellicles which are characterized by excellent resistance to hydrocarbons and most of the other common organic solvents, and by excellent dry strength, toughness, elastic modulus and softening points.

Those hydrolyzed interpolymers of empirical formula $(C_2H_4)_x.(C_2H_3OH)_y.(C_2H_3OR)_z$, as hereinbefore defined, which have substantial wet strength in the form of untreated pellicles, are in addition not dissolved by cold water, e. g., water at 25° C. As a matter of fact none of said hydrolyzed interpolymers is dissolved by water having a temperature within the range of from 0° C. to 50° C.

Hydrolyzed interpolymers of empirical formula $(C_2H_4)_x.(C_2H_3OH)_y.(C_2H_3OR)_z$, as hereinbefore defined, which do provide untreated pellicles of lower wet strength, are particularly useful in the preparation of calendered fabrics, adhesives, coatings and safety glass interlayers.

Hydrolyzed interpolymers having the empirical formula $(C_2H_4)_x.(C_2H_3OH)_y.(C_2H_3OR)_z$, as hereinbefore defined, in which the ratio of $y+z$ to $x$ is within the range of from 1:5 to about 6:1 are further characterized by substantial insolubility in both hot and cold water. Said hydrolyzed interpolymers, which are prepared, for instance, from interpolymers of ethylene with vinyl acetate containing from 62% to about 5% ethylene by weight, can be melt spun. In addition, said hydrolyzed interpolymers can be spun from a solution in an organic solvent such as a mixture of two parts by weight of trichloroethylene and one part by weight of ethanol. The filaments had by both of the aforementioned spinning processes are strong and can be cold or hot drawn either as monofils or yarns to reduce their cross section and increase their tensile strengths. The monofils can be spun in a wide range of diameters. Those of bristle size have surprisingly good stiffness both wet and dry and can be used in making brushes. The monofils can also be used in making screens and fabrics. The yarns can be used alone or in conjunction with other fibers or yarns in the preparation of fabrics. The yarn can also be cut into lengths to form staple fibers.

Of the aforementioned hydrolyzed interpolymers, those in which the ratio of $y+z$ to $x$ is within the range of from 1:3 to 3:1 are of particular importance. There may be obtained filaments and fibers of said hydrolyzed interpolymers having dry tenacities of not less than 4.5 to 5 g./d. at 10% elongation, and wet tenacities closely approaching their dry tenacities. Furthermore, said hydrolyzed interpolymers in which the ratio of $y+z$ to $x$ is within the restricted range of from 1:3 to 1:2, and in which $z$ is substantially zero, appear to be of greatest commercial importance in that fibers thereof closely resemble silk and nylon in many important respects. Said fibers have good dye receptivity, tenacities usually of more than 6 g./d. at 10% elongation, wet tenacities of at least 80% of their dry tenacities and excellent resistance even to hot water, e. g. water at 80° C. Fabrics thereof, e. g. stockings, closely resemble corresponding silk and nylon fabrics in physical appearance. In addition, said fabrics have markedly better resistance to abrasion and markedly better wear resistance than silk fabrics.

Hydrolyzed interpolymers having the empirical formula $(C_2H_4)_x.(C_2H_3OH)_y.(C_2H_3OR)_z$, as hereinbefore defined, in which the ratio of $y+z$ to $x$ is within the range of from about 6:1 to 50:1 and in which $z$ is substantially zero, are hydrophilic but are not dissolved by cold water. While said hydrolyzed interpolymers, which are prepared, for instance, from interpolymers of ethylene with vinyl acetate containing from about 5% to about 0.65% ethylene by weight, cannot be melt spun by the method employed for hydrolyzed interpolymers in which said ratio is within the range of from 1:5 to about 6:1, all of them can be spun easily from a solution in an organic solvent, such as an alcoholic solvent, e. g., a mixture of alcohol and water. The resultant filaments are strong and can be cold or hot drawn either as monofils or yarns to reduce their cross section and increase their tensile strengths, and, like those from interpolymers in which said ratio is within the range of from 1:5 to about 6:1, films and filaments of said hydrolyzed interpolymers are well adapted for the production of fabrics. Pellicles of said hydrolyzed interpolymers in which the ratio of $y+z$ to $x$ is within the range of from about 6:1 to 50:1 can likewise be prepared. The difference in water sensitivity between polyvinyl alcohol and said hydrolyzed interpolymers is shown in the following table in which the tensile strengths of films are compared after soaking in water at 25° C. for fifteen minutes.

| Polymer | Wet tensile strength, lb./in.² |
|---|---|
| Polyvinyl alcohol | 0 |
| Hydrolyzed ethylene/vinyl acetate interpolymer had by substantially complete hydrolysis in an alkaline medium of an interpolymer in which the mol ratio of vinyl acetate to ethylene was about 25:1, i. e. which contained 1.3% ethylene by weight. | 1,820 |

Of the aforementioned hydrolyzed interpolymers, those in which the ratio of $y+z$ to $x$ is within the range of from about 10:1 to about 30:1, e. g. those obtained by substantially completely hydrolyzing in an alkaline medium an interpolymer of ethylene with vinyl acetate containing from about 3.2% to about 1.1% ethylene by weight, are of particular importance. Said hydrolyzed interpolymers are not dissolved by cold water, but they are swelled thereby and they are hydrophylic and can be dissolved in hot water, e. g. water at 80° C. Furthermore, when dissolved in hot water, they remain in solution for quite some time when cooled to room temperature, e. g. at 25° C. or below. Said hydrolyzed interpolymers are particularly useful as gelatin substitutes in photographic films. As disclosed in copending U. S. application Serial No. 528,945, filed March 31, 1944, by David Malcolm McQueen, they provide photographic emulsions which are uniform, stable, resistant to bacteria and which form water-permeable layers which are tough and flexible over a wide range of temperatures. Photographic films had therewith provide superior definition of the black silver image and can be processed at a temperature of 50° C. without causing reticulation. Filaments and fibers of said hydrolyzed interpolymers can be drawn at draw ratios of as high as 10 to 1 whereas comparable polyvinyl alcohol filaments and fibers have not been drawn at draw ratios higher than 7.9 to 1. Thus there may be had from said hydrolyzed interpolymers filaments and fibers having remarkably high tenacities of the order of at least 10 g./d.

For the present purposes the hydrolyzed interpolymers of this invention which are substantially completely hydrolyzed, i. e. more than 98% hydrolyzed, are preferred. Said hydrolyzed interpolymers have the empirical formula

$$(C_2H_4)_x . (C_2H_3OH)_y . (C_2H_3OR)_z$$

wherein R is an acyl radical of an organic monocarboxylic acid and $x$, $y$ and $z$ are numbers, the ratio of $y+z$ to $x$ being within the range of from 1:5 to 50:1 and the ratio of $y$ to $z$ being greater than 49:1. Optimum results are had when $z$ in the aforementioned empirical formula is substantially zero. However, the partially hydrolyzed interpolymers of this invention, i. e., those in which the ratio of $y$ to $z$ is within the range of from 4:1 to 49:1 (80%–98% hydrolyzed interpolymers), are best adapted for certain uses. Said hydrolyzed interpolymers are more pliable than the substantially completely hydrolyzed interpolymers and hence are preferred, for instance, for use as fabric coatings.

The hydrolyzed products of this invention can be molded into tough, strong compositions of interest in such applications as golf ball covers and other molded objects. In addition, these hydrolyzed products can be extruded in the form of tubing and can be melt cast or cast from suitable solvent to give thin films suitable for wrapping purposes.

Films can be obtained by calendering the hydrolyzed products. The hydrolyzed products are free from nerve and calendering is readily accomplished. Films of the hydrolyzed interpolymers are more water-resistant than polyvinyl alcohol films and therefore much more suitable for general wrapping film use. Thicker films can be used for lamination between two layers of plate glass to give a very desirable type of strong safety glass. These films also have the desirable combination of being resistant to water and grease and oils, and for this reason are useful for fuel cell liners, fuel hose liners, collapsible tubes, and the like. Another use for the hydrolyzed products is the preparation of a polarizing sheet, e. g., by the process of U. S. 2,237,567 or 2,246,087. Solutions of the hydrolyzed products can also be coated on paper to give an oil-, grease- and water-resistant paper suitable for the construction of oil containers. Non-fibrous film such as regenerated cellulose films, lowly esterified or esterified cellulose film, polyvinyl alcohol film, or the like may also be similarly coated and, if desired, the base film may be impregnated or otherwise treated with an anchoring agent to improve the bond between the base film and the coating. Solutions of the hydrolyzed products can also be coated on fabrics to give strong, flexible articles. A further use for the products is in impregnating raw hide, for such impregnation improves the fullness of the hide particularly on subsequent treatment with formaldehyde.

In the above and other applications the products of this invention can be admixed with modifying agents, for example, pigments, plasticizers, blending agents, wax or other moisture-proofing agents, dyes, resins, and fillers.

As disclosed in copending U. S. application Serial No. 530,951, filed April 13, 1944, by Cole Coolidge, hydrolyzed vinyl ester/ethylene interpolymers which are insoluble in cold water but which are hydrophilic can be used in the preparation of grease-resistant, water-receptive, non-printing areas of planographic, lithographic printing plates. These hydrolyzed vinyl ester/ethylene interpolymers after suitable treatment with a water-soluble light-sensitive bichromate, exposure to light and development, can also be employed satisfactorily in the grease-receptive printing areas of the lithographic plate.

The polymers of this invention can be readily modified by chemical reactions and in this respect are much more versatile than polyvinyl alcohol itself. Thus, they can be converted into chlorine-containing polymers on treatment with chlorine. The new hydrolyzed ethylene-organic vinyl ester interpolymers react with p-toluenesulfonyl chloride or with aliphatic sulfonyl chlorides such as butanesulfonyl chloride in pyridine suspension at low temperature to give the corresponding polysulfonates of the polyalcohol and with naphthenic acid chlorides to form oil-soluble esters. The sulfonates of the new polymers of this invention can be employed as alkylating agents for amines containing amino hydrogens. The new polymers can also be readily etherified with sodium chloroacetate. This can be carried out by the addition of an alkaline aqueous solution of sodium chloroacetate to an alkaline alcohol solution of the polyalcohol. Dialysis of the reaction mixture, filtration of the resulting solution, followed by evaporation of the filtrate leaves a water-soluble etherified polymer. Maleic anhydride and phthalic anhydride react with hydrolyzed ethylene-vinyl organic ester interpolymer to give good yields of alkali-soluble, water-soluble polycarboxylic acids. Reaction with dioxolane in the presence of an acid catalyst converts the hydrolyzed interpolymer into an insoluble product. Hydrolyzed ethylene-vinyl organic ester interpolymers can be oxidized with hot concentrated nitric acid to yield dibasic acids. The hydrolyzed interpolymers form complexes with boric acid. The hydrolyzed interpolymers are converted into sulfates on treatment with chlorosulfonic acid as described in copending application Serial No. 450,405, filed July 10, 1942; into acetals on reaction with aldehydes as described in copending application Serial No. 447,589, filed June 18, 1942; and into xanthates on conversion into the corresponding alkali alcoholates and subsequent reaction with carbon disulfide as described in copending application Serial No. 447,590, filed June 18, 1942. Reaction of the hydrolyzed ethylene-vinyl organic ester interpolymers with ethylene oxide yields water-soluble hydroxyalkyl ethers possessing utility as detergents, while by reaction with urea or with nitrourea film-forming polyurethanes are obtained.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful.

1. A solid, macromolecular, hydrolyzed interpolymer of ethylene with a vinyl ester of an organic monocarboxylic acid, said hydrolyzed interpolymer having the empirical formula $$(C_2H_4)_x.(C_2H_3OH)_y.(C_2H_3OR)_z$$

wherein R is an acyl radical of an organic monocarboxylic acid and $x$, $y$ and $z$ are numbers, the ratio of $y+z$ to $x$ being within the range of from 1:5 to 50:1 and the ratio of $y$ to $z$ being at least 4:1.

2. A macromolecular, hydrolyzed interpolymer of ethylene with vinyl formate, said hydrolyzed interpolymer having substantial wet strength when in the form of an untreated pellicle and having the empirical formula

wherein $x$, $y$ and $z$ are numbers, the ratio of $y+z$ to $x$ being within the range of from 1:5 to 50:1 and the ratio of $y$ to $z$ being at least 4:1.

3. A macromolecular, hydrolyzed interpolymer of ethylene with a vinyl ester of an organic monocarboxylic acid, said hydrolyzed interpolymer having substantial wet strength when in the form of an untreated pellicle and having the empirical formula $(C_2H_4)_x.(C_2H_3OH)_y.(C_2H_3OR)_z$, wherein R is an acyl radical of an acid having the general formula R'COOH, in which R' is a hydrocarbon radical free from unsaturated linkages between acyclic carbon atoms, any carbon atom therein alpha to the carbon atom in the carboxyl group of said acid being attached to at least one, but not more than three, carbon atoms, and $x$, $y$ and $z$ are numbers, the ratio of $y+z$ to $x$ being within the range of from 1:5 to 50:1 and the ratio of $y$ to $z$ being at least 4:1.

4. A product as defined in claim 3, wherein R is an acyl radical of an acid having the general formula $C_nH_{2n+1}COOH$, in which $n$ is a positive integer within the range of from 1 to 6.

5. A macromolecular, hydrolyzed interpolymer of ethylene with vinyl acetate, said hydrolyzed interpolymer having substantial wet strength when in the form of an untreated pellicle and having the empirical formula

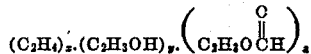

wherein $x$, $y$ and $z$ are numbers, the ratio of $y+z$ to $x$ being within the range of from 1:5 to 50:1 and the ratio of $y$ to $z$ being at least 4:1.

6. A macromolecular, hydrolyzed interpolymer of ethylene with vinyl acetate, said hydrolyzed interpolymer having a wet strength of at least 300 lbs./sq. in. when in the form of an untreated pellicle and having the empirical formula

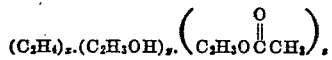

wherein $x$, $y$ and $z$ are numbers, the ratio of $y+z$ to $x$ being within the range of from 1:5 to 50:1 and the ratio of $y$ to $z$ being greater than 49:1.

7. A product as defined in claim 6 wherein the ratio of $y+z$ to $x$ is within the range of from 1:3 to 3:1.

8. A macromolecular, hydrolyzed interpolymer of ethylene with vinyl acetate, said hydrolyzed interpolymer having a wet strength of at least 1000 lbs./sq. in. when in the form of an untreated pellicle and having the empirical formula

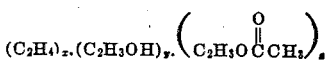

wherein $x$, $y$ and $z$ are numbers, the ratio of $y+z$ to $x$ being within the range of from 1:3 to 1:2, $z$ being substantially zero.

9. A product as defined in claim 6 wherein the ratio of $y+z$ to $x$ is within the range of from 10:1 to 50:1.

10. A macromolecular, hydrolyzed interpolymer of ethylene with vinyl acetate, said hydrolyzed interpolymer having a wet strength of at least 1000 lbs./sq. in. when in the form of an untreated pellicle and having the empirical formula

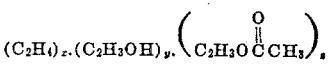

wherein $x$, $y$ and $z$ are numbers, the ratio of $y+z$ to $x$ being within the range of from 10:1 to 30:1, $z$ being substantially zero.

11. An artificial filament comprising essentially a hydrolyzed interpolymer of ethylene with a vinyl ester of an organic monocarboxylic acid defined in claim 1.

12. An artificial filament comprising essentially a hydrolyzed interpolymer of ethylene with vinyl acetate as defined in claim 5.

13. An artificial filament comprising essentially a hydrolyzed interpolymer of ethylene with vinyl acetate as defined in claim 6.

14. An artificial filament comprising essentially a hydrolyzed interpolymer of ethylene with vinyl acetate as defined in claim 8.

15. An artificial filament comprising essentially a hydrolyzed interpolymer of ethylene with vinyl acetate as defined in claim 10.

16. A film comprising essentially a hydrolyzed interpolymer of ethylene with a vinyl ester of an organic monocarboxylic acid defined in claim 1.

17. A film comprising essentially a hydrolyzed interpolymer of ethylene with vinyl acetate defined in claim 5.

18. A film comprising essentially a hydrolyzed interpolymer of ethylene with vinyl acetate defined in claim 6.

19. A film comprising essentially a hydrolyzed interpolymer of ethylene with vinyl acetate defined in claim 8.

20. A film comprising essentially a hydrolyzed interpolymer of ethylene with vinyl acetate defined in claim 10.

21. The method for obtaining a solid, macromolecular, hydrolyzed interpolymer having the empirical formula $$(C_2H_4)_x.(C_2H_3OH)_y.(C_2H_3OR)_z$$

wherein R is an acyl radical of an organic monocarboxylic acid and $x$, $y$ and $z$ are numbers, the ratio of $y+z$ to $x$ being within the range of from 1:5 to 50:1 and the ratio of $y$ to $z$ being at least 4:1, which comprises hydrolyzing a solid, macromolecular interpolymer of ethylene with a vinyl ester of an organic monocarboxylic acid in which the mol ratio of vinyl ester to ethylene is within the range of from 1:5 to 50:1 until said hydrolyzed interpolymer is produced, and isolating said hydrolyzed interpolymer.

22. The method for obtaining a solid, macromolecular hydrolyzed interpolymer having the empirical formula

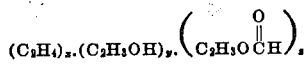

wherein $x$, $y$ and $z$ are numbers, the ratio of $y+z$ to $x$ being within the range of from 1:5 to 50:1 and the ratio of $y$ to $z$ being at least 4:1, which comprises heating, in an alkaline liquid medium comprising at least 25% by weight of a primary alcohol which is liquid at 25° C., a solid, macromolecular interpolymer of ethylene with vinyl formate, the mol ratio of vinyl formate to ethylene in said interpolymer being within the range of from 1:5 to 50:1, said heating being continued until said hydrolyzed interpolymer is produced, and isolating said hydrolyzed interpolymer.

23. The method for obtaining a solid, macromolecular, hydrolyzed interpolymer having the empirical formula $$(C_2H_4)_x.(C_2H_3OH)_y.(C_2H_3OR)_z$$

wherein R is an acyl radical of an acid having the general formula R'COOH, in which R' is a hydrocarbon radical free from unsaturated linkages between acyclic carbon atoms, any carbon atom therein alpha to the carbon atom in the carboxyl group of said acid being attached to at least one, but not more than three, carbon atoms, and $x$, $y$ and $z$ are numbers, the ratio of $y+z$ to $x$ being within the range of from 1:5 to 50:1 and the ratio of $y$ to $z$ being at least 4:1, which comprises heating, in an alkaline liquid medium comprising at least 25% by weight of a primary alcohol which is liquid at 25° C., a solid, macromolecular interpolymer of ethylene with a vinyl ester of an acid having the general formula R'COOH, wherein R' is a hydrocarbon radical, free from unsaturated linkages between acyclic carbon atoms, in which any carbon atom alpha to to the carbon atom in the carboxyl group of said acid is attached to at least one, but not more than three, carbon atoms, the mol ratio of said vinyl ester to said ethylene in said interpolymer being within the range of from 1:5 to 50:1, said heating being continued until said hydrolyzed interpolymer is produced, and isolating said hydrolyzed interpolymer.

24. The method for obtaining a solid, macromolecular hydrolyzed interpolymer having the empirical formula

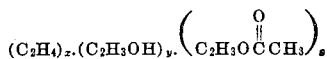

wherein $x$, $y$ and $z$ are numbers, the ratio of $y+z$ to $x$ being within the range of from 1:5 to 50:1 and the ratio of $y$ to $z$ being at least 4:1, which comprises heating in an alkaline liquid medium, comprising at least 25% by weight of an alcohol having the general formula $C_nH_{2n+1}OH$, wherein $n$ is a positive integer within the range of from 1 to 4, a solid, macromolecular interpolymer of ethylene with vinyl acetate, in which the mol ratio of vinyl acetate to ethylene is within the range of from 1:5 to 50:1, said heating being continued until said hydrolyzed interpolymer is produced, and isolating said hydrolyzed interpolymer.

25. The method for obtaining a solid, macromolecular, hydrolyzed interpolymer having the property of forming untreated pellicles of substantial wet strength and having the empirical formula

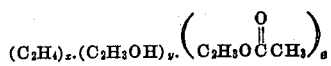

wherein $x$, $y$ and $z$ are numbers, the ratio of $y+z$ to $x$ being within the range of from 1:3 to 1:2, $z$ being substantially zero, which comprises boiling in an alkaline liquid medium comprising at least 25% by weight of an alcohol having the general formula $C_nH_{2n+1}OH$, wherein $n$ is a positive integer within the range of from 1 to 4, a solid, macromolecular interpolymer of ethylene with vinyl acetate in which the mol ratio of vinyl acetate to ethylene is within the range of from 1:3 to 1:2, said boiling being continued until said hydrolyzed interpolymer is produced, and isolating said hydrolyzed interpolymer.

26. The method for obtaining a solid, macromolecular, hydrolyzed interpolymer having the property of forming untreated pellicles of substantial wet strength and having the empirical formula

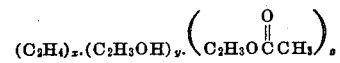

wherein $x$, $y$ and $z$ are numbers, the ratio of $y+z$ to $x$ being within the range of from 10:1 to 30:1, $z$ being substantially zero, which comprises boiling in an alkaline liquid medium comprising at least 25% by weight of an alcohol having the general formula $C_nH_{2n+1}OH$, wherein $n$ is a positive integer within the range of from 1 to 4, a solid, macromolecular interpolymer of ethylene with vinyl acetate in which the mol ratio of vinyl acetate to ethylene is within the range of from 10:1 to 30:1, said boiling being continued until said hydrolyzed interpolymer is produced, and isolating said hydrolyzed interpolymer.

27. A filament comprising essentially a hydrolyzed interpolymer of ethylene with a vinyl ester of an organic monocarboxylic acid as defined in claim 1, said filament showing orientation along the filament axis.

28. A filament comprising essentially a hydrolyzed interpolymer of ethylene with vinyl acetate as defined in claim 8, said filament showing orientation along the filament axis.

29. A filament comprising essentially a hydrolyzed interpolymer of ethylene with vinyl acetate as defined in claim 10, said filament showing orientation along the filament axis.

JOHN R. ROLAND, Jr.

CERTIFICATE OF CORRECTION.

Patent No. 2,386,347.  October 9, 1945.

JOHN R. ROLAND, JR.

It is hereby certified that error appears in the printed specification of the above numbered patent requiring correction as follows: Page 1, second column, line 16, for the word "form" read --from--; page 7, second column, line 31, for "interpolmers" read --interpolymers--; page 9, second column, line 4-5, for "esterified" read --etherified--; and that the said Letters Patent should be read with this correction therein that the same may conform to the record of the case in the Patent Office.

Signed and sealed this 18th day of December, A. D. 1945.

Leslie Frazer (Seal)  First Assistant Commissioner of Patents.